United States Patent [19]

Messenger

[11] 4,226,426
[45] Oct. 7, 1980

[54] SEMI-UNITIZED SHAFT SEAL

[75] Inventor: Edward J. Messenger, Longview, Tex.

[73] Assignee: Garlock Inc., Longview, Tex.

[21] Appl. No.: 14,926

[22] Filed: Feb. 26, 1979

Related U.S. Application Data

[63] Continuation-in-part of Ser. No. 664,625, Mar. 8, 1976.

[51] Int. Cl.³ .................. F16J 15/32; B16D 53/00
[52] U.S. Cl. ..................................... 277/37; 277/153
[58] Field of Search .................................. 277/37–39, 277/152, 153, 157

[56] References Cited

U.S. PATENT DOCUMENTS

| 3,021,161 | 2/1962 | Rhoads et al. | 277/153 |
| 3,231,284 | 1/1966 | Peickii et al. | 277/38 |
| 3,341,265 | 9/1967 | Paterson | 277/37 |
| 3,682,480 | 8/1972 | Matsushima | 277/39 |

Primary Examiner—Robert I. Smith
Attorney, Agent, or Firm—Schovee & Boston

[57] ABSTRACT

A two-part, separable, semi-unitized shaft seal for sealing between a housing bore and a relatively rotatable shaft extending through the bore and comprising a metal wear sleeve and a sealing member assembled onto the wear sleeve for shipment and installation of the seal as a unitized seal. However, when the housing and shaft are disassembled, the sealing member remains with the housing and the wear sleeve remains with the shaft, whereby each part can be examined and separately replaced, if necessary, without discarding the entire seal. The wear sleeve pressfits onto the shaft and the sealing member forms an elastomeric interference fit in the housing bore.

18 Claims, 7 Drawing Figures

SEMI-UNITIZED SHAFT SEAL

CROSS REFERENCE TO RELATED APPLICATIONS

This application is a C.I.P. of applicant's copending patent application Ser. No. 664,625, filed Mar. 8, 1976, and entitled SEMI-UNITIZED SHAFT SEAL AND METHOD.

BACKGROUND OF THE INVENTION

1. Field of the Invention

This invention relates to shaft seals and in particular to an improved, semi-unitized shaft seal.

2. Description of the Prior Art

Shaft seals, including unitized hub seals are well-known in the prior art. Such prior art unitized hub-type shaft seals include a wear sleeve assembly and a sealing element, the two pieces being unitized and one piece press-fitting onto the shaft and the other piece having a ridged elastomeric O.D. interference fit into the housing. Such prior art unitized seals are installed by, for example, press-fitting it onto the axle and then installing the wheel hub onto the axle and seal with the elastomeric ridges of the seal sliding into the wheel hub bore. Upon removal of the wheel, the entire unitized seal stays on the axle and can be removed from the axle and the entire seal can be replaced if necessary. The interference fit between the wheel hub and the seal O.D. resists removal of the hub therefrom and additional force must be used in removal of the hub. Other prior art unitized seals are press-fitted into the wheel hub bore and the entire unitized seal remains in that bore when the wheel is removed from the axle.

Such prior art unitized hub shaft seals are subject to a variety of disadvantages and problems. It is a primary object of the present invention to provide an improved hub-type shaft seal that overcomes various problems in the prior art.

It is a further object of the present invention to provide a semi-unitized shaft seal which is installed as a unit but in which, when the wheel hub is removed from the shaft, the sealing member stays with the wheel hub and the wear sleeve stays on the axle, allowing the wheel hub to be removed from the axle without resistance from the seal. It is a still further object of the present invention to provide a two-part semi-unitized shaft seal that can be disassembled and each part examined for damage and wear, and replaced separately if necessary, in contrast to the prior art unitized seal which cannot be disassembled for inspection and which must be completely discarded and replaced if one part is damaged or worn.

It is a still further object of the present invention to provide a shaft seal having a sealing lip that runs on a smaller diameter wear surface whereby it will have a longer life than prior art shaft seals having a sealing lip that must run on a larger diameter wear surface.

It is another object of the present invention to provide a semi-unitized shaft seal with a sealing lip that more easily dissipates heat. It is a further object of the present invention to provide a semi-unitized shaft seal with a wear surface which is more accurately concentric than in the prior art shaft seals. It is still further object of the present invention to provide a semi-unitized shaft seal that does not require an internal gasket, which gaskets are susceptible to being cut or damaged during manufacture and installation. It is another object of the present invention to provide, a semi-unitized shaft seal having positive and constant lubrication at the lip without requiring lubricant to go through, for example, holes or passageways to lubricate the sealing lip. It is a still further object of the present invention to provide a semi-unitized shaft seal that does not have metal parts that can interfere with each other during rotation.

It is another object of this invention to provide a semi-unitized shaft seal that allows the area directly over where the sealing lip contacts the wear sleeve to be continually flooded with oil to dissipate heat, and that has no area where dirt and water can become lodged or trapped.

SUMMARY OF THE INVENTION

A two-part, separable, semi-unitized hub-type shaft seal for sealing between a housing bore and a relatively rotatable shaft and including a metal wear sleeve including a cylindrical wear sleeve portion and a radial flange, with the cylindrical portion adapted to press-fit onto a shaft, and a sealing member assembled onto the wear sleeve member. The sealing member includes a metal retainer ring, an elastomeric body bonded to the retainer ring and a sealing element cartridge press-fitted into the retainer ring. The sealing element cartridge includes a leather sealing element having a sealing lip forced by a garter spring into sealing contact with the wear surface of the cylindrical portion of the wear sleeve. The elastomeric body includes an elastomeric layer bonded to the O. D. of the retainer ring and being adapted to provide an interference fit in the housing bore. The elastomeric body also includes an annular elastomeric bumper member extending axially into contact with a radial face of the radial flange of the wear sleeve, for axially locating the sealing member on the wear sleeve and for aiding in preventing dirt from passing into the sealing lip area.

This seal can be assembled, transported and installed as a unitized seal, however, it can be disassembled for inspection and replacement of either or both parts. Upon removal of the housing from the shaft, one seal part stays with the housing while the other part stays with the shaft, whereby the seal of the present invention does not resist removal of the housing from the shaft. The parent application Ser. No. 664,625 is hereby incorporated by reference in its entirety in this application.

The seals of the present invention are particularly useful in applications where there is a large distance or gap between the shaft and the housing bore, in which case it would be relatively difficult to have the retainer ring also function as the outer case by being crimped down onto the inner case to lock the leather sealing element in place, as is done in FIG. 6 of the parent application Ser. No. 664,625 referred to above. The present invention solves this difficulty, although it does require the additional element of a separate outer case (such as outer case 142 in FIG. 1).

BRIEF DESCRIPTION OF THE DRAWINGS

The present invention will be more fully understood by reference to the following detailed description thereof, when read in conjunction with the attached drawings wherein.

DETAILED DESCRIPTION OF THE INVENTION

Figure 1:
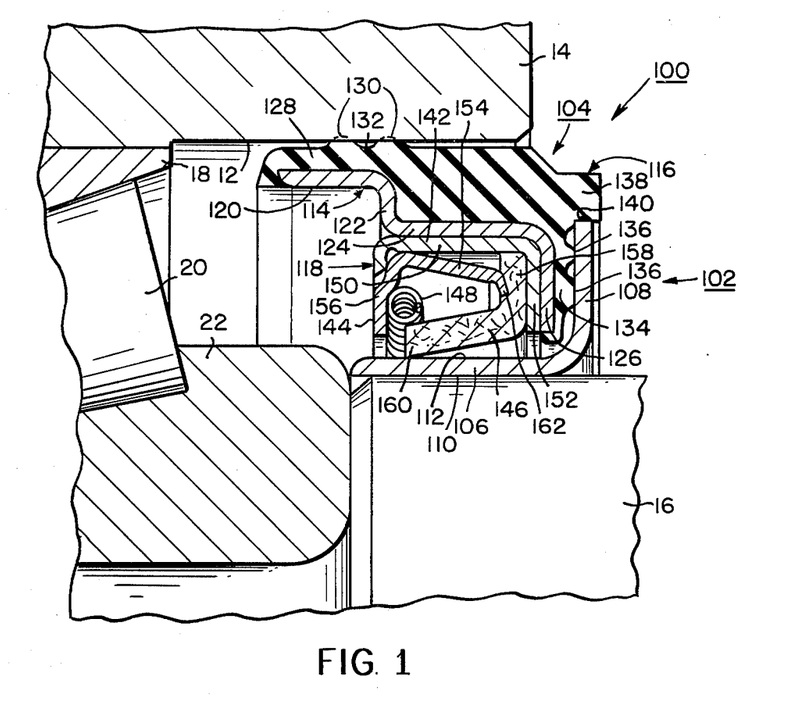
FIG. 1 is a fragmentary, partial cross-sectional view of a seal according to one embodiment of the invention and shown installed between a housing and a shaft.

With reference now to the drawings, FIG. 1 shows a seal 100 according to a preferred embodiment of the present invention, for use between a bore 12 of a housing 14 and a shaft 16. In the particular application illustrated, the housing 14 is a hub of a truck wheel and the shaft 16 is the axle or spindle on which the hub rotates. FIG. 1 also shows a bearing assembly including a bearing cup 18, a roller bearing 20, and a bearing cone 22.

The two-part, separable, semi-unitized seal 100 includes a wear sleeve 102 and a sealing member 104. The wear sleeve 102 includes a radially inner cylindrical portion 106 and a radial flange 108 extending radially outwardly from the axially outer end of the cylindrical portion 106. The inner cylindrical portion 106 has an I.D. surface 110 of a size adapted to press fit onto the shaft 16 and has an O.D. wear surface 112 for the sealing lip (described below).

The sealing member 104 is movable axially onto and off of the wear sleeve 102 and is assembled onto the wear sleeve in separable, semi-unitized relationship relative thereto. The sealing member 104 includes a retainer ring 114, an elastomeric body 116 bonded to the retainer ring 114, and also includes a sealing element cartridge 118 press fitted into the retainer ring 114.

The retainer ring 114 includes a radially outer cylindrical portion 120 connected to an intermediate radial flange 122 extending radially inwardly from the axially outer end of the outer cylindrical portion 120; the intermediate radial flange 122 is connected in turn to a radially inner cylindrical portion 124, extending axially outwardly from the radially inner end of the intermediate radial flange 122; and the inner cylindrical portion 124 is connected in turn to a radially inner radial flange 126 extending radially inwardly from the axially outer end of the inner cylindrical portion 124.

The elastomeric body 116 includes a layer 128 of elastomer bonded to the O.D. surface of the outer cylindrical portion 120 and adapted to form an interference fit in the bore 12 of the housing 14. The layer 128 preferably includes a plurality of spaced-apart annular ridges 130 having a valley 132 located between adjacent ridges. The valley 132 is designed to accommodate elastomeric material that is displaced from the ridges as a result of the interference fit. The ridges 130 are preferably designed to be displaced more than 50% of their height to provide the interference fit. The elastomeric body 116 also includes an elastomeric bumper member 134 bonded to the axially outer radial surface of the radial flange 126 and extending axially outwardly therefrom into contact with the axially inner radial surface of the radial flange 108 of the wear sleeve 102, for axially locating the sealing member 104 with respect to the wear sleeve 102 and for aiding in preventing dirt from passing into the seal 100. Because there is relative rotational movement between the bumper member 134 and the radial flange 108, the seal 100 is preferably pre-lubricated at this area. The bumper member 134 preferably includes a plurality of radially spaced-apart annular rings 136. The elastomeric body in this embodiment also includes an axially outwardly extending dirt shield 138 for aiding in preventing brake dust and/or other dirt from entering the seal 100. The dirt shield 138 may or may not contact the distal end 140 of the radial flange 108.

The sealing element cartridge 118 includes a radially outer case 142, a radially inner case 144, a leather sealing element 146 and a garter spring 148. The outer case 142 includes a cylindrical portion 150 and a radial flange 152. The inner case 144 includes a tapered flange 154, and a generally radial stepped flange 156. The leather sealing element 146 includes a radial portion 158 and a sealing lip 160. The sealing element cartridge 118 is assembled by placing the radial portion 158 of the leather sealing element 146 against the radial flange 152 of the outer case 142 and then locking the inner case 144 in place by crimping or curling the axially inner edge of the cylindrical portion 150 of the outer case down onto the inner case as shown in FIG. 1. This locks the inner case inside the outer case, and by forcing the distal end 162 of the tapered flange 154 of the inner case against and into the leather sealing element 146, thus also locks the leather sealing element in place. The garter spring 148 is located in place prior to crimping the outer case onto the inner case. The axially inner end of the cylindrical portion 150 of the outer case 142, and the axially outer end 162 of the tapered flange 154 of the inner case 144 are reduced in thickness for ease of crimping or curling.

The sealing member 104 is then assembled onto the wear sleeve 102 by sliding it axially thereon until the bumper member 135 contacts the radial flange 108. The seal 100 can then be stored, shipped and assembled as a unitized seal.

The sealing element cartridge 118 is preferably treated as an integral part of the sealing member 104, such that if any part of the cartridge 118 is defective and needs replacement, the entire sealing member 104 is replaced. However, because the cartridge 118 is a press-fit in the retainer ring 114, it can, if desired, be removed and replaced separately from the remainder of the sealing member 104 without having to discard such remainder [similarly, the remainder (the retainer ring 114 and the elastomeric body) can, if defective, be separated from the cartridge and replaced with a new unit without having to discard the cartridge].

As shown in the drawings, the "axially outer" direction is the direction to the right, as will be understood by those skilled in the art.

Figure 2:
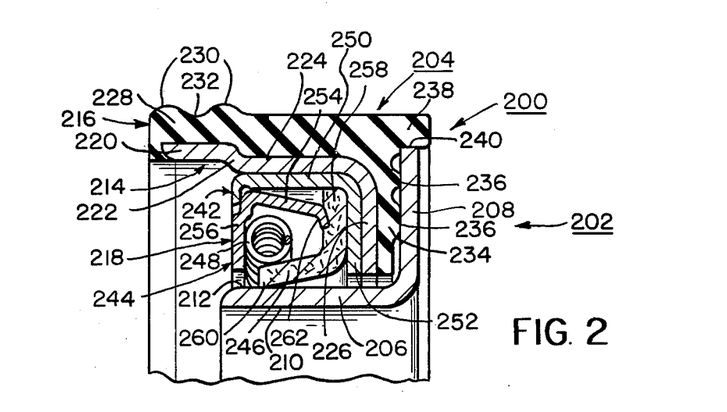
FIGS. 2–7 are each fragmentary, partial cross-sectional views of seals according to additional embodiments of the present invention. For simplicity, FIGS. 2–7 do not show the shaft 16, housing 14, etc. shown in FIG. 1, however, it is to be understood that the seals shown in FIGS. 2–7 are used and installed in the same manner as is the seal of FIG. 1.

FIG. 2 shows a seal 200 including a wear sleeve 202 and a sealing member 204. The wear sleeve 202 includes a radially inner cylindrical portion 206 and a radial flange 208 extending radially outwardly from the axially outer end of the cylindrical portion 206. The inner cylindrical portion 206 has an I.D. surface 210 of a size adapted to press fit onto the shaft 16 and has an O.D. wear surface 212 for the sealing lip (described below).

The sealing member 204 is movable axially onto and off of the wear sleeve 202 and is assembled onto the wear sleeve in separable, semi-unitized relationship relative thereto. The sealing member 204 includes a retainer ring 214, an elastomeric body 216 bonded to the retainer ring 214, and also includes a sealing element cartridge 218 press fitted into the retainer ring 214.

The retainer ring 214 includes a radially outer cylindrical portion 220, an intermediate radial flange 222 extending radially inwardly from the axially outer end of the outer cylindrical portion 220, a radially inner cylindrical portion 224 extending axially outwardly from the radially inner end of the intermediate radial flange 222 and a radial flange 226 extending radially inwardly from the axially outer end of the inner cylindrical portion 224.

The elastomeric body 216 includes a layer 228 of elastomer bonded to the O.D. surface of the outer cylindrical portion 220 and adapted to form an interference fit in the bore 12 of the housing 14. The layer 228 preferably includes a plurality of spaced-apart annular ridges 230 having a valley 232 located between adjacent ridges. The valley 232 is designed to accommodate elastomeric material that is displaced from the ridges as a result of the interference fit. The ridges 230 are preferably designed to be displaced more than 50% of their height to provide the interference fit. The elastomeric body 216 also includes an elastomeric bumper member 234 bonded to the axially outer radial surface of the radial flange 226 and extending axially outwardly therefrom into contact with the axially inner radial surface of the radial flange 208 of the wear sleeve 202, for axially locating the sealing member 204 with respect to the wear sleeve 202 and for aiding in preventing dirt from passing into the seal 200. Because there is relative rotational movement between the bumper member 234 and the radial flange 208, the seal 200 is preferably pre-lubricated at this area. The bumper member 234 preferably includes a plurality of radially spaced-apart annular rings 236. The elastomeric body in this embodiment also includes an axially outwardly extending dirt shield 238 for aiding in preventing brake dust and/or other dirt from entering the seal 200. The dirt shield 238 may or may not contact the distal end 240 of the radial flange 208.

The sealing element cartridge 218 includes a radially outer case 242, a radially inner case 244, a leather sealing element 246 and a garter spring 248. The outer case 242 includes a cylindrical portion 250 and a radial flange 252. The inner case 244 includes a tapered flange 254, and a generally radial stepped flange 256. The leather sealing element 246 includes a radial portion 258 and a sealing lip 260. The sealing element cartridge 218 is assembled by placing the radial portion 258 of the leather sealing element 246 against the radial flange 252 of the outer case 242 and then locking the inner case 244 in place by crimping or curling the axially inner edge of the cylindrical portion 250 of the outer case down onto the inner case as shown in FIG. 2. This locks the inner case inside the outer case, and by forcing the distal end 262 of the tapered flange 254 of the inner case against and into the leather sealing element 246, thus also locks the leather sealing element in place. The garter spring 248 is located in place prior to crimping the outer case onto the inner case. The axially inner end of the cylindrical portion 250 of the outer case 242, and the axially outer end 262 of the tapered flange 254 of the inner case 244 are reduced in thickness for each of crimping or curling.

The sealing member 204 is then assembled onto the wear sleeve 202 by sliding it axially thereon until the bumper member 234 contacts the radial flange 208. The seal 200 can then be stored, shipped and assembled as a unitized seal.

Figure 3:
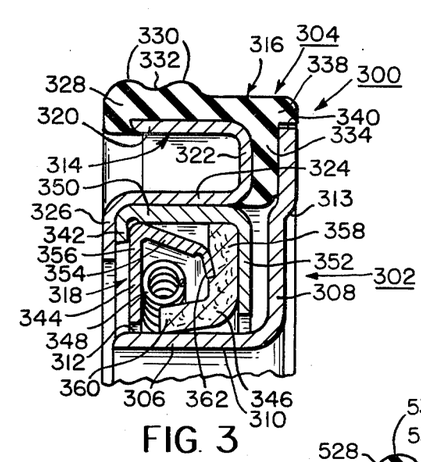

FIG. 3 shows a seal 300 including a wear sleeve 302 and a sealing member 304. The wear sleeve 302 includes a radially inner cylindrical portion 306 and a radial flange 308 extending radially outwardly from the axially outer end of the cylindrical portion 306. The radial flange 308 includes a step 313 to strengthen and reinforce it and to help maintain it relatively flat. The inner cylindrical portion 306 has an I.D. surface 310 of a size adapted to press fit onto the shaft 16 and has an O.D. wear surface 312 for the sealing lip (described below).

The sealing member 304 is movable axially onto and off of the wear sleeve 302 and is assembled onto the wear sleeve in separable, semi-unitized relationship relative thereto. The sealing member 304 includes a retainer ring 314, an elastomeric body 316 bonded to the retainer ring 314, and also includes a sealing element cartridge 318 press fitted into the retainer ring 314.

The retainer ring 314 includes a radially outer cylindrical portion 320, an intermediate radial flange 322 extending radially inwardly from the axially outer end of the outer cylindrical portion 320, a radially inner cylindrical portion 324 extending axially inwardly from the radially inner end of the intermediate radial flange 322 and a radial flange 326 extending radially inwardly from the axially inner end of the inner cylindrical portion 324.

The elastomeric body 316 includes a layer 328 of elastomer bonded to the O.D. surface of the outer cylindrical portion 320 and adapted to form an interference fit in the bore 12 of the housing 14. The layer 328 preferably includes a plurality of spaced-apart annular ridges 330 having a valley 322 located between adjacent ridges. The valley 332 is designed to accommodate elastomeric material that is displaced from the ridges as a result of the interference fit. The ridges 330 are preferably designed to be displaced more than 50% of their height to provide the interference fit. The elastomeric body 316 also includes an elastomeric bumper member 334 bonded to the axially outer radial surface of the radial flange 322 and extending axially outwardly therefrom into contact with the axially inner radial surface of the radial flange 308 of the wear sleeve 302, for axially locating the sealing member 304 with respect to the wear sleeve 302 and for aiding in preventing dirt from passing into the seal 300. Because there is relative rotational movement between the bumper member 334 and the radial flange 308, the seal 300 is preferably pre-lubricated at this area. The elastomeric body in this embodiment also includes an axially outwardly extending dirt shield 338 for aiding in preventing brake dust and/or other dirt from entering the seal 300. The dirt shield 338 may or may not contact the distal end 340 of the radial flange 308.

The sealing element cartridge 318 includes a radially outer case 342, a radially inner case 344, a leather sealing element 346 and a garter spring 348. The outer case 342 includes a cylindrical portion 350 and a radial flange 352. The inner case 344 includes a tapered flange 354, and a radial flange 356. The leather sealing element 346 includes a radial portion 358 and a sealing lip 360. The sealing element cartridge 318 is assembled by placing the radial portion 358 of the leather sealing element 346 against the radial flange 352 of the outer case 342 and then locking the inner case 344 in place by crimping or curling the axially inner edge of the cylindrical portion 350 of the outer case down into the inner case as shown in FIG. 3. This locks the inner case inside the outer case, and by forcing the distal end 362 of the tapered flange 354 of the inner case against and into the leather sealing element 346, thus also locks the leather sealing element in place. The garter spring 348 is located in place prior to crimping the outer case onto the inner case. The axially inner end of the cylindrical portion 350 of the outer case 342, and the axially outer end 362 of the tapered flange 354 of the inner case 344 are reduced in thickness for ease of crimping or curling.

The sealing member 304 is then assembled onto the wear sleeve 302 by sliding it axially thereon until the bumper member 334 contacts the radial flange 308. The seal 300 can then be stored, shipped and assembled as a unitized seal.

FIG. 3 shows the axially inner end of the cylindrical portion 306 of the wear sleeve 302 terminating short of the axially inner end of the sealing member 304. This is one possible alternative, however, the preferred alternative is as shown in FIGS. 4 and 5 whereby a standard installation tool can be used.

Figure 4:
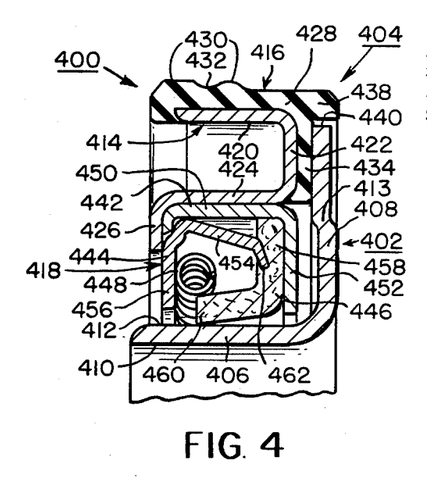
Figure 5:
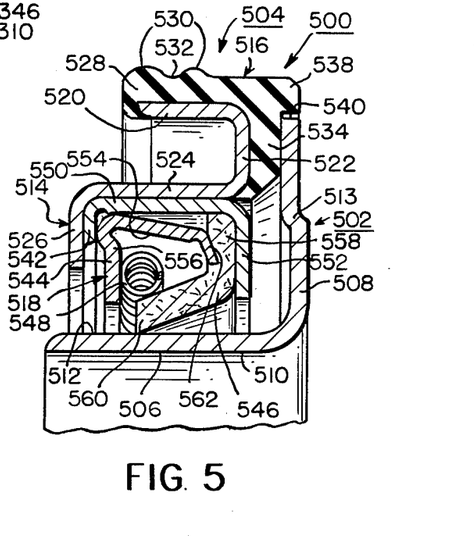

FIG. 4 shows a seal 400 including a wear sleeve 402 and a sealing member 404. The wear sleeve 402 includes a radially inner cylindrical portion 406 and a radial flange 408 extending radially outwardly from the axially outer end of the cylindrical portion 406. The radial flange 408 includes a step 413 to strengthen and reinforce it and to help maintain it relatively flat. The inner cylindrical portion 406 has an I.D. surface 410 of a size adapted to press fit onto the shaft 16 and has an O.D. wear surface 412 for the sealing lip (described below).

The sealing member 404 is movable axially onto and off of the wear sleeve 402 and is assembled onto the wear sleeve in separable, semi-unitized relationship relative thereto. The sealing member 404 includes a retainer ring 414, an elastomeric body 416 bonded to the retainer ring 414, and also includes a sealing element cartridge 418 press fitted into the retainer ring 414.

The retainer ring 414 includes a radially outer cylindrical portion 420, an intermediate radial flange 422 extending radially inwardly from the axially outer end of the outer cylindrical portion 420, a radially inner cylindrical portion 424 extending axially inwardly from the radially inner end of the intermediate radial flange 422 and a radial flange 426 extending radially inwardly from the axially inner end of the inner cylindrical portion 424.

The elastomeric body 416 includes a layer 428 of elastomer bonded to the O.D. surface of the outer cylindrical portion 420 and adapted to form an interference fit in the bore 12 of the housing 14. The layer 428 preferably includes a plurality of spaced-apart annular ridges 430 having a valley 432 located between adjacent ridges. The valley 432 is designed to accommodate elastomeric material that is displaced from the ridges as a result of the interference fit. The ridges 430 are preferably designed to be displaced more than 50% of their height to provide the interference fit. The elastomeric body 416 also includes an elastomeric bumper member 434 bonded to the axially outer radial surface of the radial flange 422 and extending axially outwardly therefrom into contact with the axially inner radial surface of the radial flange 408 of the wear sleeve 402, for axially locating the sealing member 404 with respect to the wear sleeve 402 and for aiding in preventing dirt from passing into the seal 400. Because there is relative rotational movement between the bumper member 434 and the radial flange 408, the seal 400 is preferably pre-lubricated at this area. The elastomeric body in this embodiment also includes an axially outwardly extending dirt shield 438 for aiding in preventing brake dust and/or other dirt from entering the seal 400. The dirt shield 438 may or may not contact the distal end 440 of the radial flange 408.

The sealing element cartridge 418 includes a radially outer case 442, a radially inner case 444, a leather sealing element 446 and a garter spring 448. The outer case 442 includes a cylindrical portion 450 and a radial flange 452. The inner case 444 includes a tapered flange 454, and a generally radial stepped flange 456. The leather sealing element 446 includes a radial portion 458 and a sealing lip 460. The sealing element cartridge 418 is assembled by placing the radial portion 458 of the leather sealing element 446 against the radial flange 452 of the outer case 442 and then locking the inner case 444 in place by crimping or curling the axially inner edge of the cylindrical portion 450 of the outer case down onto the inner case as shown in FIG. 4. This locks the inner case inside the outer case, and by forcing the distal end 462 of the tapered flange 454 of the inner case against and into the leather sealing element 446, thus also locks the leather sealing element in place. The garter spring 448 is located in place prior to crimping the outer case onto the inner case. The axially inner end of the cylindrical portion 450 of the outer case 442, and the axially outer end 462 of the tapered flange 454 of the inner case 444 are reduced in thickness for ease of crimping or curling.

The sealing member 404 is then assembled onto the wear sleeve 402 by sliding it axially thereon until the bumper member 434 contacts the radial flange 408. The seal 400 can then be stored, shipped and assembled as a unitized seal.

FIG. 5 shows a seal 500 including a wear sleeve 502 and a sealing member 504. The wear sleeve 502 includes a radially inner cylindrical portion 506 and a radial flange 508 extending radially outwardly from the axially outer end of the cylindrical portion 506. The radial flange 508 includes a step 513 to strengthen and reinforce it and to help maintain it relatively flat. The inner cylindrical portion 506 has an I.D. surface 510 of a size adapted to press fit onto the shaft 16 and has an O.D. wear surface 512 for the sealing lip (described below).

The sealing member 504 is movable axially onto and off of the wear sleeve 502 and is assembled onto the wear sleeve in separable, semi-unitized relationship relative thereto. The sealing member 504 includes a retainer ring 154, an elastomeric body 516 bonded to the retainer ring 514, and also includes a sealing element cartridge 518 press fitted into the retainer ring 514.

The retainer ring 514 includes a radially outer cylindrical portion 520, an intermediate radial flange 522 extending radially inwardly from the axially outer end of the outer cylindrical portion 520, a radially inner cylindrical portion 524 extending axially inwardly from the radially inner end of the intermediate radial flange 522 and a radial flange 526 extending radially inwardly from the axially inner end of the inner cylindrical portion 524.

The elastomeric body 516 includes a layer 528 of elastomer bonded to the O.D. surface of the outer cylindrical portion 520 and adapted to form an interference fit in the bore 12 of the housing 14. The layer 528 preferably includes a plurality of spaced-apart annular ridges 530 having a valley 532 located between adjacent ridges. The valley 532 is designed to accommodate elastomeric material that is displaced from the ridges as a result of the interference fit. The ridges 530 are preferably designed to be displaced more than 50% of their height to provide the interference fit. The elastomeric body 516 also includes an elastomeric bumper member 534 bonded to the axially outer radial surface of the radial flange 522 and extending axially outwardly therefrom into contact with the axially inner radial surface of the radial flange 508 of the wear sleeve 502, for axially locating the sealing member 504 with respect to the wear sleeve 502 and for aiding in preventing dirt from passing into the seal 500. Because there is relative rotational movement between the bumper member 534 and the radial flange 508, the seal 500 is preferably prelubricated at this area. The elastomeric body in this embodiment also includes an axially outwardly extending dirt shield 538 for aiding in preventing brake dust and/or other dirt from entering the seal 500. The dirt shield 538 may or may not contact the distal end 540 of the radial flange 508.

The sealing element cartridge 518 includes a radially outer case 542, a radially inner case 544, a leather sealing element 546 and a garter spring 548. The outer case 542 includes a cylindrical portion 550 and a radial flange 552. The inner case 544 includes a tapered flange 554, and a generally radial stepped flange 556. The leather sealing element 546 includes a radial portion 558 and a sealing lip 560. The sealing element cartridge 518 is assembled by placing the radial portion 558 of the leather sealing element 546 against the radial flange 552 of the outer case 542 and then locking the inner case 544 in place by crimping or curling the axially inner edge of the cylindrical portion 550 of the outer case down onto the inner case as shown in FIG. 5. This locks the inner case inside the outer case, and by forcing the distal end 562 of the tapered flange 554 of the inner case against and into the leather sealing element 546, thus also locks the leather sealing element in place. The garter spring 548 is located in place prior to crimping the outer case onto the inner case. The axially inner end of the cylindrical portion 550 of the outer case 542, and the axially outer end 562 of the tapered flange 554 of the inner case 544 are reduced in thickness for ease of crimping or curling.

The sealing member 504 is then assembled onto the wear sleeve 502 by sliding it axially thereon until the bumper member 534 contacts the radial flange 508. The seal 500 can then be stored, shipped and assembled as a unitized seal.

Figure 6:
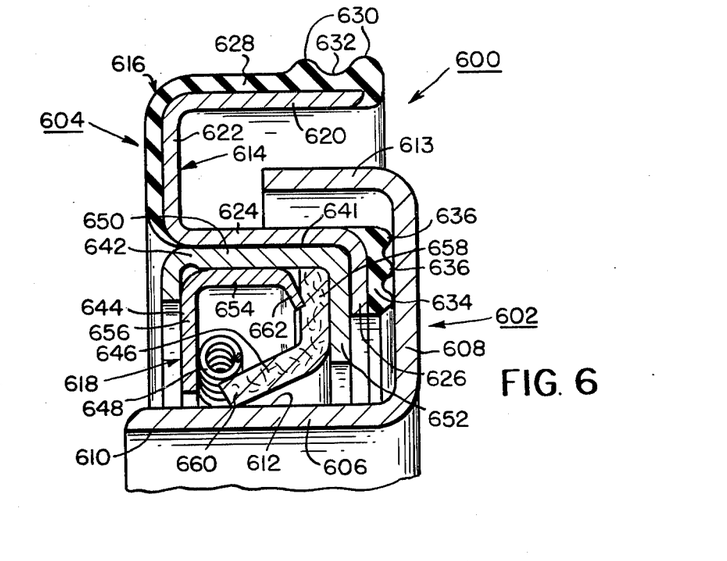

FIG. 6 shows a seal 600 including a wear sleeve 602 and a sealing member 604. The wear sleeve 602 includes a radially inner cylindrical portion 606, a radial flange 608 extending radially outwardly from the axially outer end of the cylindrical portion 606, and an outer cylindrical portion 613 extending axially inwardly from the radially outer end of the radial flange 508. The inner cylindrical portion 606 has an I.D. surface 610 of a size adapted to press fit onto the shaft 16 and has an O.D. wear surface 612 for the sealing lip (described below).

The sealing member 604 is movable axially onto and off of the wear sleeve 602 and is assembled onto the wear sleeve in separable, semi-unitized relationship relative thereto. The sealing member 604 includes a retainer ring 614, an elastomeric body 616 bonded to the retainer ring 614, and also includes a sealing element cartridge 618 press fitted into the retainer ring 614.

The retainer ring 614 includes a radially outer cylindrical portion 620, an intermediate radial flange 622 extending radially inwardly from the axially inner end of the outer cylindrical portion 620, a radially inner cylindrical portion 624 extending axially outwardy from the radially inner end of the intermediate radial flange 622 and a radial flange 626 extending radially inwardly from the axially outer end of the inner cylindrical portion 624.

The elastomeric body 616 includes a layer 628 of elastomer bonded to the O.D. surface of the outer cylindrical portion 620 and adapted to form an interference fit in the bore 12 of the housing 14. The layer 628 preferably includes a plurality of spaced-apart annular ridges 630 having a valley 632 located between adjacent ridges. The valley 632 is designed to accommodate elastomeric material that is displaced from the ridges as a result of the interference fit. The ridges 630 are preferably designed to be displaced more than 50% of their height to provide the interference fit. The elastomeric body 616 also includes an elastomeric bumper member 634 bonded to the axially outer radial surface of the radial flange 626 and extending axially outwardly therefrom into contact with the axially inner radial surface of the radial flange 608 of the wear sleeve 602, for axially locating the sealing member 604 with respect to the wear sleeve 602 and for aiding in preventing dirt from passing into the seal 600. Because there is relative rotational movement between the bumper member 634 and the radial flange 608, the seal 600 is preferably prelubricated at this area. The bumper member 634 preferably includes a plurality of radially spaced-apart annular rings 636. The elastomeric body 616 also includes a thin layer 641 of elastomer bonded to the I.D. of the inner cylindrical portion 624. This layer 641 is preferably about 0.020 inch thick and provides a seal between the retainer ring 614 and the cartridge 618. A similar layer of rubber can be used in any of the other embodiments described herein.

The sealing element cartridge 618 includes a radially outer case 642, a radially inner case 644, a leather sealing element 646 and a garter spring 648. The outer case 642 includes a cylindrical portion 650 and a radial flange 652. The inner case 644 includes a a cylindrical portion 654 with a tapered or crimped distal end 662 and a radial flange 656. The leather sealing element 646 includes a radial portion 658 and a sealing lip 660. The sealing element cartridge 618 is assembled by placing the radial portion 658 of the leather sealing element 646 against the radial flange 652 of the outer case 642 and then locking the inner case 644 in place by crimping or curling the axially inner edge of the cylindrical portion 650 of the outer case down onto the inner case as shown in FIG. 6. This locks the inner case inside the outer case, and by forcing the distal end 662 of the cylindrical portion 654 against and into the leather sealing element 646, thus also locks the leather sealing element in place. The garter spring 648 is located in place prior to crimping the outer case onto the inner case. The axially inner end of the cylindrical portion 650 of the outer case 642, and the axially outer end 662 of the inner case 644 are reduced in thickness for ease of crimping or curling.

The sealing member 604 is then assembled onto the wear sleeve 602 by sliding it axially thereon until the bumper member 634 contacts the radial flange 608. The seal 600 can then be stored, shipped and assembled as a unitized seal.

Figure 7:
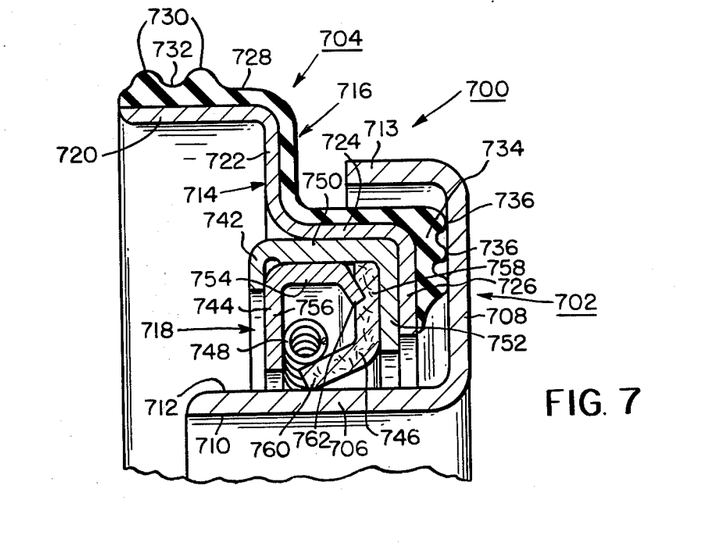

FIG. 7 shows a seal 700 including a wear sleeve 702 and a sealing member 704. The wear sleeve 702 includes a radially inner cylindrical portion 706, a radial flange 708 extending radially outwardly from the axially outer end of the cylindrical portion 706, and an outer cylindrical portion 713 extending axially inwardly from the radially outer end of the radial flange 708. The inner cylindrical portion 706 has an I.D. surface 710 of a size adapted to press fit onto the shaft 16 and has an O.D. wear surface 712 for the sealing lip (described below).

The sealing member 704 is movable axially onto and off of the wear sleeve 702 and is assembled onto the wear sleeve in separable, semi-unitized relationship relative thereto. The sealing member 704 includes a retainer ring 714, an elastomeric body 716 bonded to the retainer ring 714, and also includes a sealing element cartridge 718 press fitted into the retainer ring 714.

The retainer ring 714 includes a radially outer cylindrical portion 720, an intermediate radial flange 722 extending radially inwardly from the axially outer end of the outer cylindrical portion 720, a radially inner cylindrical portion 724 extending axially outwardly from the radially inner end of the intermediate radial flange 722 and a radial flange 726 extending radially inwardly from the axially outer end of the inner cylindrical portion 724.

The elastomeric body 716 includes a layer 728 of elastomer bonded to the O.D. surface of the outer cylindrical portion 720 and adapted to form an interference fit in the bore 12 of the housing 14. The layer 728 preferably includes a plurality of spaced-apart annular ridges 730 having a valley 732 located between adjacent ridges. The valley 732 is designed to accommodate elastomeric material that is displaced from the ridges as a result of the interference fit. The ridges 730 are preferably designed to be displaced more than 50% of their height to provide the interference fit. The elastomeric body 716 also includes an elastomeric bumper member 734 bonded to the axially outer radial surface of the radial flange 726 and extending axially outwardly therefrom into contact with the axially inner radial surface of the radial flange 708 of the wear sleeve 702, for axially locating the sealing member 704 with respect to the wear sleeve 702 and for aiding in preventing dirt from passing into the seal 700. Because there is relative rotational movement between the bumper member 734 and the radial flange 708, the seal 700 is preferably pre-lubricated at this area. The bumper member 734 preferably includes a plurality of radially spaced-apart annular rings 736.

The sealing element cartridge 718 includes a radially outer case 742, a radially inner case 744, a leather sealing element 746 and a garter spring 748. The outer case 742 includes a cylindrical portion 750 and a radial flange 752. The inner case 744 includes a cylindrical portion 754 with a tapered or crimped distal end 762 and a radial flange 756. The leather sealing element 746 includes a radial portion 758 and a sealing lip 760. The sealing element cartridge 718 is assembled by placing the radial portion 758 of the leather sealing element 746 against the radial flange 752 of the outer case 742 and then locking the inner case 744 in place by crimping or curling the axially inner edge of the cylindrical portion 750 of the outer case down onto the inner case as shown in FIG. 7. This locks the inner case inside the outer case, and by forcing the distal end 762 of the cylindrical portion 754 of the inner case against and into the leather sealing element 746, thus also locks the leather sealing element in place. The garter spring 748 is located in place prior to crimping the outer case onto the inner case. The axially inner end of the cylindrical portion 750 of the outer case 742, and the axially outer end 762 of the inner case 744 are reduced in thickness for ease of crimping or curling.

The sealing member 704 is then assembled onto the wear sleeve 702 by sliding it axially thereon until the bumper member 734 contacts the radial flange 708. The seal 700 can then be stored, shipped and assembled as a unitized seal.

The invention has been described in detail with particular reference to the preferred embodiments thereof, but it will be understood that variations and modifications can be affected within the spirit and scope of the invention as described hereinafter and as defined in the appended claims. For example, the cylindrical portions 654 and 754 of the inner case of FIGS. 6 and 7, respectively can alternatively be tapered as in FIG. 1-5, and similarly the tapered flanges of the inner cases of FIGS. 1-5 can be cylindrical. The bumper members of the embodiments of FIGS. 3-5 can alternatively include the preferred annular rings as shown in FIGS. 1, 2, 6, and 7 if desired. Further, the term "leather" is hereby defined for use in the present specification and claims to include synthetic as well as natural leather and also leather-like materials.

I claim:

1. A two-part, separable, semi-unitized shaft seal for providing a seal between a housing bore and a relatively rotatable shaft extending through the bore, said seal comprising:
   (a) a wear sleeve including a radially inner cylindrical portion and a radial flange extending radially outwardly from the axially outer end of said cylindrical portion, said cylindrical portion having an I.D. adapted to press fit onto a shaft and having an O.D. wear surface for the below-recited sealing lip; and
   (b) a sealing member movable axially onto and off of said wear sleeve and assembled onto said wear sleeve in separable, semi-unitized relationship relative thereto, said sealing member including a retainer ring, an elastomeric body bonded to said retainer ring, and a sealing element cartridge press-fitted into said retainer ring,
      (1) said retainer ring including a radially outer cylindrical portion connected to an intermediate radial flange connected in turn to a radially inner cylindrical portion connected in turn to a radially inner radial flange extending radially inwardly from one end of said inner cylindrical portion,
      (2) said elastomeric body including a layer of elastomer bonded to the O.D. surface of said outer cylindrical portion of said retainer ring and being adapted to form an interference fit in a housing bore, and said elastomeric body also including an elastomeric bumper member bonded to the axially outer radial surface of the axially outermost of said radial flanges of said retainer ring and extending axially outwardly therefrom into contact with the axially inner radial surface of said radial flange of said wear sleeve, for axially locating said sealing member relative to said wear sleeve and for aiding in preventing dirt from passing inwardly to the below-recited sealing lip,
      (3) said sealing element cartridge comprising a radially outer case, a radially inner case, locked inside said outer case by crimping and a leather sealing element locked between said outer and inner cases and having a sealing lip in sealing contact with said O.D. wear surface of said wear sleeve, said outer case having a radially outer cylindrical portion having an O.D. surface that is press-fitted into the I.D. surface of said inner cylindrical portion of said retainer ring, whereby said sealing member is movable axially, with respect to said wear sleeve, away from and out of contact with said wear sleeve and with said sealing lip being slidable axially off of said O.D. wear surface, for disassembling said two part separable, semi-unitized shaft seal.

2. The seal according to claim 1 including a garter spring located in contact with and between said inner case and the O.D. surface of said leather sealing element.

3. The seal according to claim 1 wherein said intermediate radial flange extends radially inwardly from the axially outer end of said outer cylindrical portion of said ring.

4. The seal according to claim 3 wherein said intermediate radial flange extends radially inwardly to the axially inner end of said inner cylindrical portion of said ring.

5. The seal according to claim 3 wherein said intermediate radial flange extends radially inwardly to the axially outer end of said inner cylindrical portion of said ring.

6. The seal according to claim 1 wherein said intermediate radial flange extends radially inwardly from the axially inner end of said outer cylindrical portion of said ring.

7. The seal according to claim 6 wherein said intermediate radial flange extends radially inwardly to the axially inner end of said inner cylindrical portion of said ring.

8. The seal according to claim 1 wherein the distal end of said radial flange of said wear sleeve terminates in a radially extending direction and wherein said elastomeric body includes an axially extending dirt shield located radially outwardly of said distal end for aiding in preventing dirt from entering into said seal.

9. The seal according to claim 8 wherein said dirt shield extends axially outwardly beyond said distal end.

10. The seal according to claim 1 wherein said radial flange of said wear sleeve has a step therein for reinforcement purposes.

11. The seal according to claim 1 wherein said wear sleeve includes a radially outer cylindrical portion extending axially inwardly from the radially outer end of said radial flange.

12. The seal according to claim 1 wherein said inner cylindrical portion of said retainer ring includes a thin layer of elastomer on its I.D. surface, for providing a seal between said I.D. surface and the O.D. surface of said outer case that is press-fitted therein.

13. The seal according to claim 1 wherein said inner case of said sealing element cartridge includes a radial flange and a tapered flange, and wherein said outer cylindrical portion of said outer case includes an axially inner distal end that is crimped down onto said radial flange of said inner case, for locking said inner case in said outer case, and wherein the distal end of said tapered flange is pressed into said leather sealing element for locking it in said sealing element cartridge.

14. The seal according to claim 13 including a garter spring located in contact with and between said inner case and the O.D. surface of said leather sealing element.

15. The seal according to claim 1 wherein said layer of elastomer includes a plurality of circumferentially spaced-apart ridges with a valley between each pair of ridges.

16. The seal according to claim 15 wherein said ridges are adapted to be compressed more than 50% in height when installed in a bore.

17. The seal according to claim 1 wherein said bumper member includes a plurality of spaced-apart annular rings extending axially outwardly into contact with the axially inner surface of said radial flange of said wear sleeve.

18. The seal according to claim 1 wherein said sealing lip extends axially inwardly

* * * * *